United States Patent
Griffin, III et al.

[11] 3,740,739
[45] June 19, 1973

[54] WELL MONITORING AND WARNING SYSTEM

[75] Inventors: Phil H. Griffin, III; Martin J. Sharki, both of Houston, Tex.

[73] Assignee: Dresser Industries, Inc., Dallas, Tex.

[22] Filed: Nov. 30, 1971

[21] Appl. No.: 203,460

Related U.S. Application Data

[63] Continuation of Ser. No. 862,215, Sept. 30, 1969, abandoned.

[52] U.S. Cl. ............... 340/239 R, 166/66, 166/75, 175/48, 340/244 B
[51] Int. Cl. ........................................ G08b 19/00
[58] Field of Search ............. 340/239 R, 244, 282, 340/421, 220; 166/54, 64–66, 75, 250, 91; 175/24, 25, 48, 65, 38; 235/92 FL

[56] References Cited
UNITED STATES PATENTS

| | | | |
|---|---|---|---|
| 1,106,126 | 8/1914 | Ytterberg | 340/282 |
| 2,730,704 | 1/1956 | Warren | 340/213.1 |
| 3,145,375 | 8/1964 | Webb | 340/280 |

Primary Examiner—John W. Caldwell
Assistant Examiner—Daniel Myer
Attorney—Robert W. Mayer, Thomas P. Hubbard, Jr., Eddie E. Scott et al.

[57] ABSTRACT

A method and apparatus for monitoring at least two process parameters and giving distinctive warnings when each of the parameters varies beyond the desired limit and a separate and distinctive warning when two or more of the parameters vary beyond desired limits at the same time.

7 Claims, 1 Drawing Figure

PATENTED JUN 19 1973
3,740,739
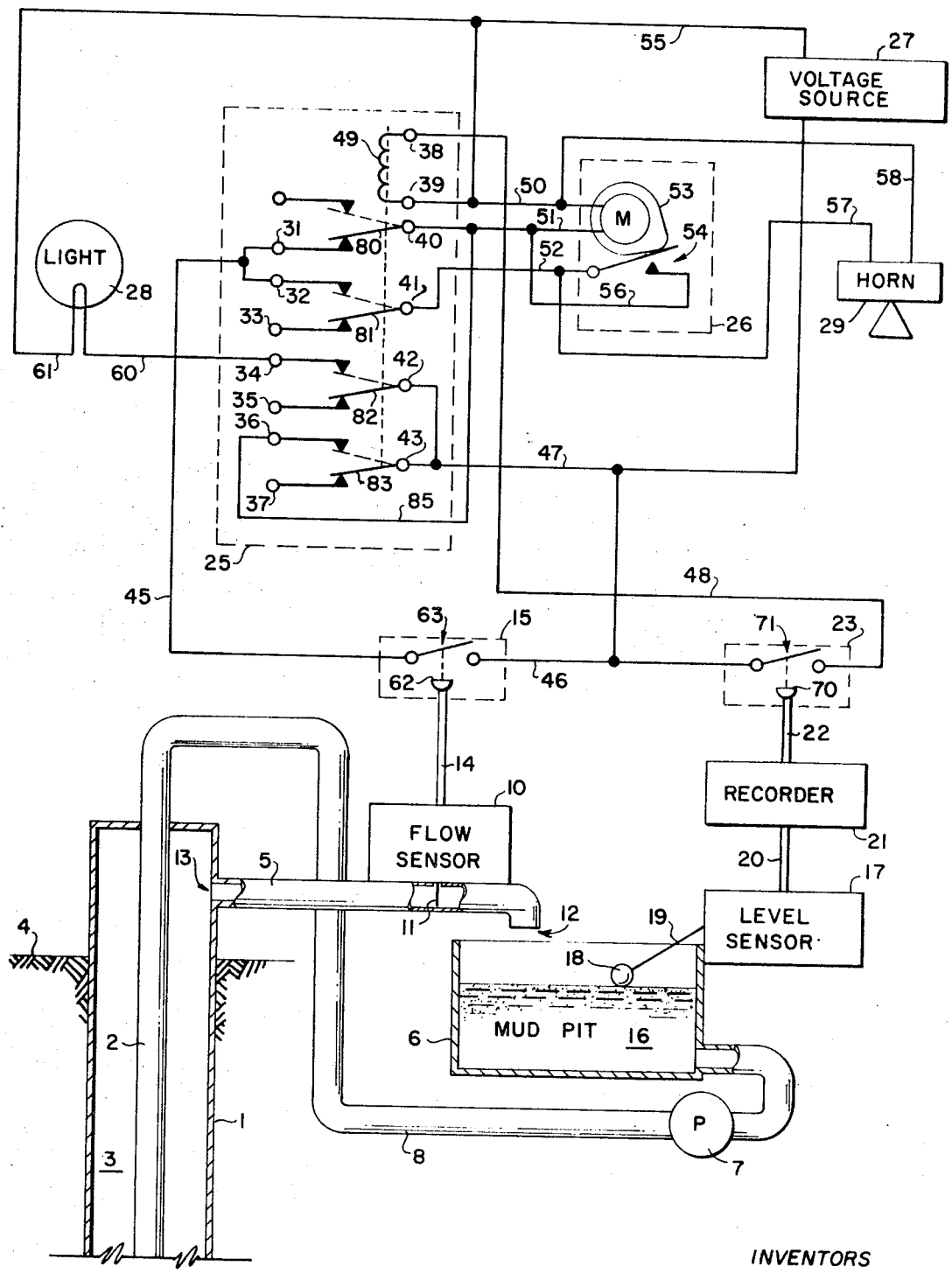
INVENTORS
PHIL H. GRIFFIN III
MARTIN J. SHARKI
ATTORNEY

WELL MONITORING AND WARNING SYSTEM

CROSS REFERENCES TO RELATED APPLICATIONS

This is a continuation of application Ser. No. 862,215 filed Sept. 30, 1969, now abandoned.

BACKGROUND OF THE INVENTION

Heretofore warning devices have been employed to give a warning signal when a process parameter has gone astray.

However, it is highly desirable to have a system and method whereby a warning signal is intensified in proportion to the extent of the problem as measured by the number of parameters that have gone astray at a given point in time. For example, when two or more parameters on a given process have varied beyond desired limits at the same times it is very desirable to give a warning which is best calculated to attract the workmen's attention and such a warning is not merely a repetition of the warnings normally given when each of the parameters goes astray by itself.

SUMMARY OF THE INVENTION

According to this invention there is provided apparatus for monitoring at least two process parameters such as temperature, pressure, liquid level, flow rates, and the like, and for giving distinctive warnings against undesired variations in one or more of these parameters and which gives a very distinctive and more imperative sounding warning when two or more of these parameters go astray at the same time. The apparatus of this invention, therefore, includes sensing means for each parameter to be monitored, at least one warning means to be employed when each parameter varies beyond desired limits by itself, and additional means for giving a completely different and therefore more attention obtaining warning when two or more parameters go astray at the same time.

This invention also relates to a method for monitoring at least two process parameters and giving distinctive warnings against undesired variations thereof by sensing variations in each parameter, giving separate and distinctive warnings when each parameter varies beyond desired limits by itself and giving a different warning from any of the other warnings when two or more of the parameters vary beyond desired limits at the same time.

This invention is useful in substantially any industrial process wherein two or more process parameters can and desirably should be monitored to keep track of the dynamic state of the process and to give warnings when this dynamic state threatens to fall below a predetermined minimum value and/or exceed a predetermined minimum value. A particularly good application for this invention is the monitoring of the well drilling process utilizing process parameters related to the drilling mud being employed. For example, two parameters which can be monitored during the drilling of a well, oil, gas, water, and the like, is the flow rate of the liquid drilling mud returning from the well bore to the mud pits in which it is stored before return downwardly into the well bore, and the liquid level of the drilling mud in the mud pits. Variations in these parameters can be used as a warning of an impending blowout of the well and therefore the apparatus and method of this invention as applied to these parameters is extremely useful as a blowout control monitoring approach for the drilling of a well. For example, increases in drilling mud flow rate from the well bore and in the liquid level height of the drilling mud in the mud pits can indicate an impending blowout before the blowout occurs therefore allowing time for workmen to take action to prevent the blowout from actually occurring. Also, decreases in the above-mentioned flow rate and liquid height can indicate loss circulation in a well thereby requiring attention of the workmen in order to resume normal drilling operations before the loss of drilling mud circulation causes any substantial amount of damage or work stoppage.

Accordingly, it is an object of this invention to provide a new and improved method and apparatus for monitoring process parameters and giving warnings against undesired variations in one or more of these parameters, the warnings increasing in their attention obtaining capability as more and more parameters go astray at the same time. It is another object to provide a new and improved method and apparatus for controlling the drilling of a well. It is another object to provide a new and improved apparatus for blowout control monitoring of a well during drilling. It is another object of the invention to provide a new and improved method and apparatus for loss circulation monitoring of a well during drilling. Other aspects, objects, and advantages of the invention will be apparent to those skilled in the art from the disclosure and the appended claims.

The DRAWING shows a system employing the concepts of this invention.

More specifically the DRAWING shows a well bore 1 drilled in the earth with tubing 2 extending downwardly thereinto. At the lower end of tubing 2 (not shown) is a conventional drilling bit used in drilling well bore 1. In the normal operating situation drilling mud is circulated downwardly in the interior of tubing 2 out through the drilling bit, and upwardly in the annulus 3 between the outer periphery of tubing 2 and inner walls of bore 1 upwardly to the earth's surface 4 through outlet pipe 5 into storage pit 6. There can be one or more storage pits as desired as this invention is applicable to one or more such pits. The drilling mud is stored in pit or pits 6 until removed therefrom pump 7 and returned to the well tubing by pipe 8 for recirculation down the tubing out through the drilling bit and up annulus 3 to outlet 5.

A conventional flow sensor 10 is mounted on outlet pipe 5 with a paddle means 11 extending down into the interior thereof to sense the flow rate of the drilling mud in 5. For example, if the flow rate increases paddle 11 is moved towards outlet end 12 of 5 whereas if the flow rate decreases paddle 11, being spring biased in that direction, moves towards inlet 13. Flow sensor 11 can be any conventional device which is commercially available such as the "Flo-Sensor" produced by Bell Engineering Company, Odessa, Tex. which has both high and low set points to allow the presetting of minimum and maximum tolerable flow rate variation.

Flow sensor 10 has a pneumatic signal output which passes through pipe 14 to a conventional diaphragm pressure switch 15 which converts the pneumatic signal to an electric signal. A suitable switch for this purpose is type D1S-H18 produced by Barksdale, Los Angeles, Calif.

Mud pit 6 containing drilling mud 16 therein has associated therewith a conventional liquid level sensor 17 which has a float 18 on arm 19 extending to and floating on the drilling mud surface in pit 6. The liquid level sensor 17 is a conventional piece of apparatus which is commercially available and which is fully and completely disclosed in U. S. Pat. No. 3,086,397, issued Apr. 23, 1963, the disclosure of which is incorporated herein by reference.

The pneumatic signal output from level sensor 17 passes through pipe 20 to a recorder 21. Recorder 21 is a conventional pneumatic recorder with high and low set points for setting maximum and minimum tolerable liquid heights for pit 6. Such a device is available from Honeywell, type 1013-300H, Fort Washington, Pa. The pneumatic output signal from recorder 21 passes through pipe 22 to a diaphragm pressure switch 23 which can be the same as diaphragm pressure switch 15 described hereinabove.

The system of the drawing also employs a conventional relay 25 such as the Potter and Brumfield, type KHS17D11 and a motor driven cam intermitter 26 such as the type CMO device of Industrial Timer, Newark, N.J., which are interconnected with one another and pressure switches 15 and 23 so as to use current from voltage source 27 to operate the light warning device 28 and the horn warning device 29 in the manner described hereinafter.

More specifically, output line 45 of switch 15 is connected to terminals 31 and 32 of relay 25 while the other output line 46 is connected to the voltage source 27. Also, one output line 47 of switch 23 is connected to line 46 and two terminals 42 and 43 of relay 25 while the other output line 48 is connected to terminal 38 of coil 49 of relay 25. Intermitter 26 has one output line 50 connected to terminal 39 of coil 49, the next output line 51 connected to terminal 40 of relay 25 and the last output line 52 connected to terminal 41 of relay 25. Lines 50 and 51 are connected to and operate the motor M which drives cam 53 thereby intermittently opening and closing switch 54. Line 50 is connected to voltage source 27 by way of line 55. Line 56 of switch 54 is connected to line 51.

Horn 29 is connected by line 57 to line 52 of intermitter 26 and by lines 58 and 55 to voltage source 27.

Light 28 is connected by line 60 to terminal 34 of relay 25 and by line 61 to voltage source 27.

In operation, pressure switches 15 and 23 are normally open as shown in the drawing. There are three conditions which can be experienced in the operation of this system. The first condition being the movement of paddle 11 of sensor 10 to the preset limit therefore either toward inlet 13 or toward outlet 12 thereby causing a pneumatic signal carried by pipe 14 to cause movement of diaphragm 62 thereby closing switch 63. The closing of switch 63 completes a circuit composed of voltage source 27, line 46, switch 63, line 45, terminal 31, terminal 40, line 51, motor M, line 50, and line 55. This starts motor M running and turns cam 53. Cam 53 intermittently opens and closes switch 54 thereby intermittently completing a circuit composed of voltage source 27, lines 55 and 58, the coil of horn 29, lines 57 and 52, switch 54, lines 56 and 51, terminal 40, terminal 31, line 45, switch 63, and line 46.

Thus, when the liquid flow rate in outlet pipe 5 varies beyond desired minimum or maximum limits preset in flow sensor 10, horn 29 is actuated intermittently to give a periodic beeping sound which can be immediately identified by workmen and which is also characteristic of the source of the problem, i.e., drilling mud flow rate in output pipe 5.

The second situation which can obtain with the system of the drawing is flow sensor 10 operating in the normal condition with switch 63 in the normal open position while level sensor 17 has varied beyond the desired and preset minimum and maximum liquid level heights for pit 6 thereby causing a pneumatic signal in pipe 22 to be transmitted to diaphragm 70 of pressure switch 23 and to cause movement thereof which will close normally open switch 71. Closure of switch 21 completes a circuit composed of voltage source 27, line 46, switch 71, line 48, terminal 38, coil 49, terminal 39, and lines 50 and 55. This switches relay 25 because of the energization of coil 49 to move all flippers 80-83 from the lower position shown in the drawing to the upper position shown by the dotted lines in the drawing.

With the relay thus switches to the up position, a circuit is completed which includes voltage source 27, line 55, motor M, line 51, line 85, terminal 36, flipper 83, terminal 43, line 47, and line 46 to voltage source 27. It should be noted that lines 46 and 47 are connected whereas lines 46 and 48 are not connected. This starts motor M which turns cam 53 thereby intermittently completing and opening a circuit composed of voltage source 27, line 55, line 58, the coil of horn 29, line 57, line 52, switch 54, line 56, line 51, line 85, terminal 36, flipper 83, terminal 43, line 47, and line 46 to voltage source 27. In this manner horn 29 is actuated intermittently.

With switch 71 closed and relay 25 switched so that flippers 80-83 are in the up position as shown by the dotted lines in the drawing, another circuit is completed which is composed of voltage source 27, line 55, line 61, light 28, line 60, terminal 34, flipper 82, terminal 42, line 47, and line 46 to voltage source 27. Thus, along with the intermittent beeping of horn 29 light 28 is lit continuously thereby giving workmen the indication that the source of the problem is the liquid level in mud pit 6 and not the drilling mud flow rate in pipe 5.

The third situation which obtains is both flow sensor 10 and level sensor 17 varying beyond their desired limits at the same time thereby closing both of switches 63 and 71 at the same time. In this situation flippers 80-83 are switched to the up position by the closure of switch 71 as described hereinabove and therefore cam 53 is driven to alternately open and close switch 54. However, intermitter 26 is overriden in this situation by a circuit composed of voltage source 27, line 46, switch 63, line 45, terminal 32, flipper 81, terminal 41, line 52, line 57, the coil of horn 29, line 58, and line 55 to voltage source 27. By this overriding circuit, horn 29 is actuated continuously along with light 29. The continuous operation of horn 29 obtains the rapid attention of workmen because it is so distinctive from the more normal intermittent beeping of horn 29 and the continuous sound of horn 29 together with the continuous lighting of light 28 indicates to the workmen more imminent peril in the form of undesired process parameter variations in both flow sensor 10 and level sensor 17 at the same time.

Different audio and/or visual warning devices and a combination of these devices can be employed to monitor other process parameters, e.g. temperature of the drilling mud, and to give different warnings and combinations of warnings in accordance with the principals described hereinabove. For example, when three process parameters are being monitored, three separate and distinct warnings can be given when each process parameter varies undesirably by itself, a fourth distinctive warning different from the first three warnings can be given any two of the three process parameters vary undesirably at the same time, and a still different warning different from the first four warnings given when all three process parameters vary undesirably at the same time. This progression can be repeated for any number of process parameters above three and is within the scope of this invention.

Further, various additional warning devices can be employed in this invention as would be obvious to those skilled in the art. For example, individual warning signals such as lights can be employed on each of flow sensor 10 and level sensor 17 so that a particular light, when lit on flow sensor 10, indicates the liquid flow deviation is in the direction of inlet 13 while a separate light, when lit, indicates the liquid flow deviation is in the direction of outlet 12. Similar reasoning applies to a pair of lights on level sensor 17, i.e., one light indicating too high a liquid level and the other light indicating too low a liquid level.

Further, a system such as that shown in the drawing can be hooked in series with one or more other similar or related systems which are applied to other wells and a central readout station set so that workmen in the readout station can monitor the process parameters for each well at that station and also obtain a composite or total readout of all the process parameters taken as a whole for each well being monitored.

Obviously, any indicating means, visual, audio (horn, whistle, bell, etc.), and the like can be employed in this invention alone or in any combination with any other indicating means.

Reasonable variations and modifications are possible within the scope of this disclosure without departing from the spirit and scope of this invention.

The embodiments of the invention in which an exclusive property or privilege is claimed are defined as follows:

1. A well monitoring system for monitoring a multiplicity of drilling parameters during the drilling of a well and giving distinctive warnings of variations of said drilling parameters beyond predetermined limits, said drilling parameters including liquid flow rate of the liquid drilling mud returning from the well and liquid height in at least one mud pit, comprising: a sensing means for monitoring each of the multiplicity of drilling parameters, said sensing means including a flow rate sensing means and a liquid level sensing means, and wherein said system includes a pair of warning means, and a relay means operatively connected to both sensing means and both warning means so that when only said flow rate sensing means varies beyond desired limits one of said warning means is actuated and when only said liquid level sensing means varies beyond desired limits the other of said warning means is actuated and when both sensing means vary beyond desired limits at the same time both warning means are actuated at the same time.

2. A well monitoring system for monitoring a multiplicity of drilling parameters during the drilling of a well and giving distinctive warnings of variations of said drilling parameters beyond predetermined limits, said drilling parameters including liquid flow rate of the liquid drilling mud returning from the well and liquid height in at least one mud pit, comprising: a sensing means for monitoring each of the multiplicity of drilling parameters, said sensing means including a flow rate sensing means and a liquid level sensing means, and wherein said system includes a pair of warning means, and a relay means and a motor driven cam intermitter means operatively connected to both sensing means and both warning means so that when only said flow sensing means varies beyond desired limits one of said warning means is actuated and when only said liquid level sensing means varies beyond desired limits the other of said warning means is actuated intermittently by said intermitter means and when both sensing means vary beyond desired limits at the same time said warning means which was intermittently operated before is now continuously operated.

3. The system according to claim 2 wherein one warning means is a light and the warning means which is operated both intermittently and continuously is a sound generating device.

4. A well monitoring system for monitoring a multiplicity of drilling parameters during the drilling of a well and giving distinctive warnings of variations of said drilling parameters beyond predetermined limits, comprising: a sensing means for monitoring each of the multiplicity of drilling parameters, said sensing means including a liquid flow rate sensing means and a liquid height sensing means, with said flow rate sensing means operatively connected to a relay means, said liquid height sensing means operatively connected to a recorder means, said recorder means operatively connected to said relay means, a first warning means operatively connected to said relay means, a motor driven cam intermitter means operatively connected to said relay means, and a second warning means operatively connected to said intermitter.

5. A well monitoring system for monitoring liquid flow rate of the liquid drilling mud returning from the well and liquid height of the drilling mud in the mud pits, said monitoring system including a first warning means that is actuated when said liquid flow rate varies beyond desired limits by itself, a second and different warning means that is actuated when said liquid height varies beyond desired limits by itself, and a third and still different warning means that is actuated when both said liquid flow rate and liquid height vary beyond desired limits at the same time, comprising: means for sensing variations in said liquid flow rate and liquid height, means for giving a separate and distinctive warning when either said liquid flow rate or said liquid height varies beyond desired limits by itself, and means for giving a different warning from any other warnings when both of said parameters vary beyond desired limits at the same time.

6. A well monitoring system for monitoring at least two well drilling parameters and for giving distinctive warnings against undesired variations in one or more of said parameters, comprising: means for sensing variations in each parameter, means including first and second warning means for giving a separate and distinctive warning when each parameter varies beyond desired limits by itself, and means including third warning means for giving a different warning from any other warnings when two or more of said parameters vary beyond desired limits at the same time, said first warning means being light, said second warning means being a means for producing intermittent audible sound, and said third warning means being a means for producing a continuous audible sound.

7. A system for monitoring two individual variable drilling parameters during the drilling of a well, comprising:
- first sensing means for sensing the variation of a first drilling parameter beyond predetermined limits, said first sensing means being a means for sensing the flow rate of the liquid drilling mud returning from the well bore;
- second sensing means for sensing the variation of a second drilling parameter beyond predetermined limits, said second sensing means being a means for sensing the liquid level of the drilling mud in the mud pits;
- first warning means for producing a distinctive first warning signal;
- second warning means for producing a distinctive second warning signal;
- third warning means for producing a distinctive third warning signal;
- first actuating means connected to said first sensing means and said first warning means for causing said first warning means to produce said first warning signal when the first sensing means senses variation of the first drilling parameter beyond the predetermined limits;
- second actuating means connected to said second sensing means and said second warning means for causing said second warning means to produce said second warning signal when the second sensing means senses variation of the second drilling parameter beyond the predetermined limits; and
- third actuating means connected to said first sensing means, said second sensing means and said third warning means for causing said third warning means to produce said third warning signal when said first sensing means and said second sensing means sense that the first drilling parameter and the second drilling parameter have varied beyond the predetermined limits.

* * * * *